(12) United States Patent
Viktorovic et al.

(10) Patent No.: US 12,651,089 B2
(45) Date of Patent: *Jun. 9, 2026

(54) ON-DEVICE IDENTITY RESOLUTION SOFTWARE DEVELOPMENT KIT

(71) Applicant: LiveRamp, Inc., San Francisco, CA (US)

(72) Inventors: Milos Viktorovic, Amsterdam (NL); Niels Baarsma, Amsterdam (NL); Ian Meyers, Berkeley, CA (US); Joseph Shannon Duncan, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/835,475

(22) PCT Filed: Jan. 31, 2023

(86) PCT No.: PCT/US2023/012010
§ 371 (c)(1),
(2) Date: Aug. 2, 2024

(87) PCT Pub. No.: WO2023/150122
PCT Pub. Date: Aug. 10, 2023

(65) Prior Publication Data
US 2025/0139284 A1 May 1, 2025

Related U.S. Application Data

(60) Provisional application No. 63/306,326, filed on Feb. 3, 2022.

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 21/6281* (2013.01)

(58) Field of Classification Search
CPC ........................... G06F 21/6245; H04W 21/02
See application file for complete search history.

(56) References Cited

U.S. PATENT DOCUMENTS

| | | | |
|---|---|---|---|
| 10,616,782 B2 | 4/2020 | Manolarakis et al. | |
| 10,990,686 B2 | 4/2021 | Roullier et al. | |

(Continued)

FOREIGN PATENT DOCUMENTS

| | | |
|---|---|---|
| CA | 2934852 A1 | 7/2015 |
| EP | 2827277 A1 | 1/2015 |

OTHER PUBLICATIONS

Extended European search report for related application No. 23750113 (dated Sep. 23, 2025).

(Continued)

*Primary Examiner* — Pramila Parthasarathy

(57) ABSTRACT

A software development kit for providing targeted messages from a remote device to a client device through an app installed on the client device operates without any personal information leaving the client device. One or more Bloom filters are created and are mapped to specific app bundle identifiers. Matched identifiers are resolved against the set of Bloom filters to targeted messages based on user identifiers. Because the processing is performed locally on the client device, no personal information leaves the client device. Real-time measurement is performed by firing conversion events to an integrated mobile network, providing analysis of the effectiveness of the targeted messaging without providing any personal information to any remote device.

18 Claims, 9 Drawing Sheets

(56)                References Cited

U.S. PATENT DOCUMENTS

| 11,223,636 | B1 | 1/2022 | Angara et al. |
| 11,550,949 | B2 * | 1/2023 | Vandanapu ............. G06F 21/45 |
| 11,580,254 | B2 * | 2/2023 | Ong .................... G06F 16/1824 |
| 12,141,314 | B2 * | 11/2024 | Tischler ............ G06F 16/24568 |
| 2013/0244614 | A1 | 9/2013 | Santamaria et al. |
| 2014/0372216 | A1 | 12/2014 | Nath et al. |
| 2015/0227977 | A1 | 8/2015 | Shottan et al. |
| 2016/0321040 | A1 | 11/2016 | Sankaranarasimhan et al. |
| 2017/0118085 | A1 | 4/2017 | McKenna et al. |
| 2020/0027125 | A1 | 1/2020 | Segalov et al. |
| 2020/0349277 | A1 | 11/2020 | Torbey |
| 2021/0248629 | A1 | 8/2021 | Sullivan et al. |
| 2021/0279363 | A1 | 9/2021 | Jones et al. |

OTHER PUBLICATIONS

Liveramp, Consumers Must Come First—Expanding ATS to Meet the Growing Needs of Mobile, Feb. 17, 2021.
Nitesh Mor, Bloom Cookies: Web Search Personalization without User Tracking, May 1, 2015.
Sacha Servan-Schreiber, Kyle Hogan, and Srini Devadas, AdVeil, Dec. 15, 2021.

* cited by examiner

Bloom Filter Bitmap

ON-DEVICE IDENTITY RESOLUTION SOFTWARE DEVELOPMENT KIT

CROSS-REFERENCE TO RELATED APPLICATIONS

This application claims the benefit of U.S. provisional patent application No. 63/306,326, filed on Feb. 3, 2022. Such application is incorporated herein by reference in its entirety.

BACKGROUND

The field of the invention is software development kits (SDKs) for applications that use mapping on a client device to enable targeted messaging without sending any personal information concerning a user of the device off of the device.

Traditional targeted messaging requires that personal information (PI) from a user be sent from the user's electronic device (computer, smartphone, tablet, etc.) to a server in remote communication with this client device. This remote device may be operated by a party that wishes to send a targeted message, or may be a supply-side platform (SSP), demand-side platform (DSP), or other network, that provides services to the party who wishes to send the targeted message. Often, the means by which information is sent from the user's electronic device is an SDK, which may consist of a library that is bundled into the software application or "app" that is installed on the device. The SDK may be specific to a particular hardware and operating system combination.

Ultimately, the party who publishes and maintains the operating system for the electronic device controls the ability of any app to send PI from the user's electronic device to any remote device. For example, Apple Computer publishes the iOS operating system used on the company's iPhone smartphones and iPad tablet devices, and Microsoft Corporation publishes the Windows operating system used on many personal computers. Should these companies or other operating system providers modify their operating systems or operating system policies in ways that restrict the ability of apps to send PI from the client device on which the operating system is installed to a remote device, then apps that depend upon this ability will cease to function properly, and will no longer work to provide targeted messages to the electronic device that are viewable by the user. In one example, Apple's App Tracking Transparency (ATT) framework provides a notification to a user when an app is downloaded or opened, asking the user if the user wishes to be tracked across third-party apps and websites. SDK developers within the Apple framework must comply with the user's requests as recorded by the ATT framework.

A great many of the services available through the World Wide Web and a great many apps that interact through the Internet are provided free of charge to the user. The business model for these services and apps thus depends upon the ability to deliver targeted messages to the user of the electronic device, because the funding to provide these services and apps is derived from the parties who wish to send these targeted messages. Without the ability to send targeted messages, many of these services and apps upon which users depend will no longer be economically feasible due to the loss of revenue, and will thus disappear. The users of these electronic devices will thus suffer the disadvantage of losing services and apps that they currently enjoy. Likewise, although messages will likely still appear, the messages will not be targeted, and thus will be of less interest to the user than targeted messages directed to the client device. For this same reason these messages will be of less value to the party who purchased the right to deliver the message, and therefore the quality and quantity of such apps will diminish.

The inventors hereof have recognized that if an operating system restricts the sending of PI from a user electronic device to a remote device, then it would be desirable to develop a system and method for providing targeted messages that does not require PI to be sent from the user electronic device to any remote device. But without sending PI from the client device, there must be some means by which targeting of the message can take place in order to avoid the problems just discussed, and it would be desirable to develop an SDK to facilitate this functionality.

References mentioned in this background section are not admitted to be prior art with respect to the present invention.

SUMMARY

The present invention is directed to an SDK for a system and method for providing targeted messages from a remote electronic device to a user electronic device (i.e., client device) through an app installed on the client device, but which operates without sending any PI from the client device to any remote device. In certain implementations of the invention, a set of Bloom filters are created from data about those who wish to send targeted messages. These may, in certain implementations, be mapped to specific app bundle identifiers for efficient, targeted download to groups of user devices. Bloom filters are a highly space-efficient data structure, such that reasonable bandwidth and storage limits for sending data to apps on the client device may be met. User logins/matched identifiers may be resolved against the set of Bloom filters to targeted messages based on user identifiers. In this way, the processing to deliver a targeted message on the basis of matching PI is performed on the client device, rather than on any remote device. Because the processing is performed locally on the client device, no PI need ever leave the client device, as all matching with PI is performed locally. Real-time view-through and click-through measurement may be performed in certain implementations by firing conversion events to an integrated mobile network, thus providing analysis of the effectiveness of the targeted messaging without providing any PI to any remote device.

In certain implementations, the SDK users may be provided with functionality to remotely adjust configuration parameters of the SDK after the SDK is installed on the client device. This may be provided through a remote management platform (which may be referred to herein as a "console"). The remote console platform may also be used to control the choice of Bloom filters on the client devices that have the SDK installed.

Certain implementations of the present invention as described herein provide a number of advantages. First, the privacy of the user of the client device is never at risk because no PI ever leaves the client device. The user thus need not depend upon security measures maintained during communications to a remote device or be concerned about a data breach at the remote device, because there is never any PI sent across a communications network or stored on any remote device. Second, the use of highly efficient Bloom filters, as well as the use of specific app bundle identifiers rather than providing a separate set of identifiers for every conceivable app, greatly limits the bandwidth and storage requirements of this approach, making such an app practical even for smartphones and similar devices operating with limited storage and bandwidth. Third, these implementations of the present invention provide the ability for those wishing to send targeted messages to continue doing so even if the sending of PI to a remote device is no longer facilitated by the applicable operating system; in this way, the economic viability of free-to-the-user services and apps may be maintained.

These and other features, objects and advantages of the present invention will become better understood from a consideration of the following detailed description of the preferred embodiments in conjunction with the drawings as described following:

DRAWINGS

DETAILED DESCRIPTION OF CERTAIN EMBODIMENT(S)

Before the present invention is described in further detail, it should be understood that the invention is not limited to the particular embodiments described in any section of the specification, and that the terms used in describing the particular embodiments are for the purpose of describing those particular embodiments only, and are not intended to be limiting, since the scope of the present invention is limited only by the claims.

Generally speaking, there are restrictions placed on how much data can be pushed from a remote device to a single client device or to a particular app on a client device. These limitations may be enforced by the operating system or the individual app. Therefore, in order to minimize the data that is delivered to any particular app or client device, certain implementations of the invention utilize a preliminary step that allows for "matchmaking" between app publishers and those who wish to provide targeted messages to the users of those apps. In one example, those wishing to deliver targeted messages may be given the option of selecting app bundles (i.e., specific app groupings) that they believe will have a high overlap with their desired messaging audience. This overlap may be facilitated by historical exposure/attribution information. In some cases, one operating system may be used as a proxy for another; for example, data from the Android operating system used on many non-Apple smartphones may be used as a proxy for iOS overlap on Apple branded smartphones based on data available through that operating system. In certain implementations a single grouping may be made for multiple apps from the same purchaser that are present on the same device; this opens up the possibility of shared storage for multiple apps, which further reduces storage and bandwidth requirements if a particular client device has installed those multiple apps. This is a common occurrence as app developers often publish multiple apps that are intended to complement one another.

Figure 1:
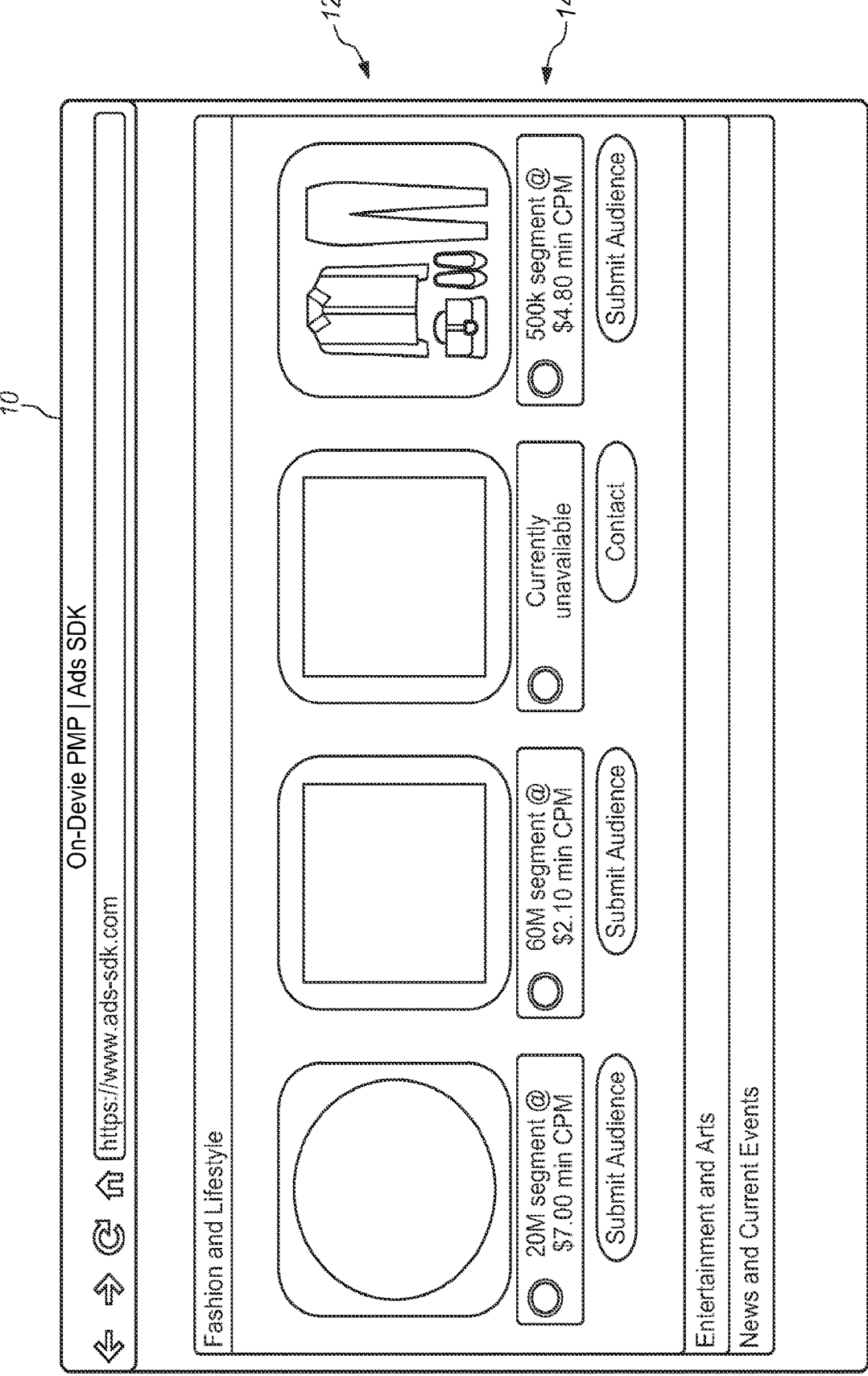
FIG. 1 is a sample screenshot of software from an implementation of the present invention which runs on a device used by a party seeking to send a targeted message according to an implementation of the present invention.

In order to facilitate this matchmaking, those who wish to deliver targeted messages may be presented with a web-based display 10 as shown in FIG. 1. This display 10 is generated from a server maintained by a DSP or other network, which may be configured through the remote management ("console") platform that controls the SDK functional parameters. As will be seen, the display breaks down various groupings of apps based on categories 12, such as "fashion and lifestyle," "entertainment and the arts," and "news and current events." The options are presented to the viewer based on category, along with segment and price information 14. The viewer (e.g., the marketer or brand owner) then makes an audience selection through the graphical user interface at the display 10.

The core of audience-based message targeting is, on the basis of an available impression, determining whether or not the impression is of interest to a party wishing to send a targeted message. In other words, whether the user that is to receive the targeted message is a member of a set. Therefore, a Bloom filter created with identifiers from users of interest can be used to test identifiers from a specific user to determine set membership. A Bloom filter is a data structure that allows for a search to determine whether a given element is present in a state. The downside of a Bloom filter is that it is a probabilistic data structure; thus, it can determine whether the element is definitely not in the set or may be in the set, but it cannot determine with 100% certainty that an element is in fact within the set. An example of a Bloom filter and a search for a particular name in the Bloom filter is shown in FIG. 2.

Figure 2:
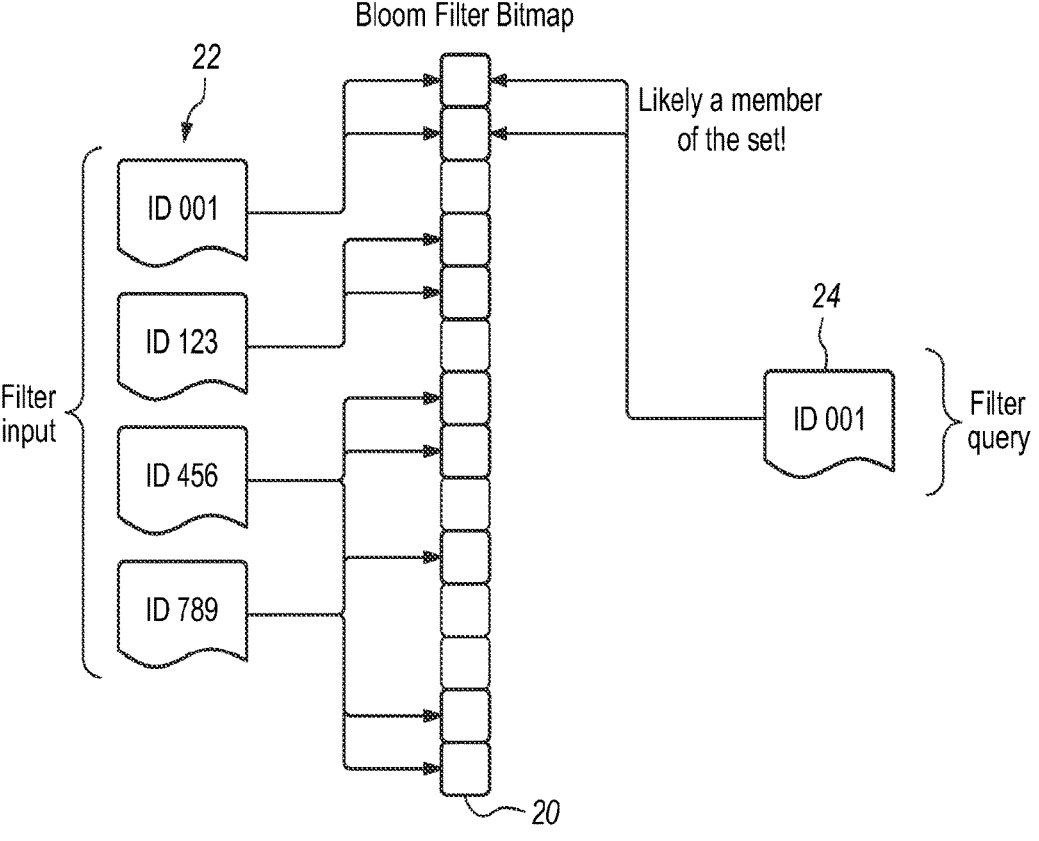
FIG. 2 is a depiction of the operation of a Bloom filter used for on-device matching.

The basic structure of a Bloom filter, as shown in FIG. 2, is a bit vector or table 20. Each empty cell in table 20 represents a bit, and is associated with an index number. To add an element to a Bloom filter as with filter inputs 22, it is hashed and the bits are set in the bit vector 20 at the index of those hashes to 1. When a string is added, the bits at the index given by the hash are set to 1. To then test for membership of a filter query 24 in the bit vector, the string is hashed with the same hash function, then it is determined whether those values are set in the bit vector 20. If those bits are not set, then one can know with certainty that the element 24 is not in the set. If they are, however, then it can only be known that the element 24 might be in the set, because another element could have set the same bit. The likelihood of such a collision depends upon the size of table 20. As will be understood, this structure requires far less storage space than a traditional data structure that fully stores all of the relevant data, although it does so by sacrificing certainty about the possibility that the desired data is definitely within the set.

The false positive rate of a Bloom filter may be modified by increasing the size of the data structure, and thus the use of a Bloom filter allows the implementations described herein to be tuned in a way that maximizes accuracy within a given limit of storage space allowed for the app or the client device. The false positive rate for a Bloom filter is approximately $(1-e^{-kn/m})$ k, where k is the number of hashing functions used, m is the number of bits for the Bloom filter, and n is the number of elements that are expected to be inserted into the filter. Given a particular value of m and n, therefore, the formula for optimizing the number of hash functions (i.e., the value of k) is k=(m/n)ln (2).

Because remote resolution services for identifiers will be unavailable in the present application, traditional identifiers or server-side secret salts cannot be used. Nevertheless, there will likely be data available to the publishers of the apps, such as an email address or telephone number. The Bloom filter may therefore use data such as email address, telephone number, or both. Other identifiers could be used in alternative implementations. Because data elements such as these are PI, however, care is taken to prevent these inputs from disclosure. The PI items are encrypted by being hashed (such as, for example, using the SHA256 algorithm) and salted. The salt is kept discrete from other salts in order to protect other workflows from any inadvertent disclosure. In a mobile environment (i.e., where the client devices are smartphones and similar devices), the salt is stored as a server-side secret. The secret can be retrieved from the device by connecting over a secure (e.g., SSL/TLS) connection that leverages a pinned certificate on the device. Unless the device is jailbroken and rooted, it will not be possible to intercept any of the traffic. The server-side secret salt can be regularly rotated and/or bound to specific audiences, protecting the underlying data. In certain implementations, the items of PI may be the subject of multiple hashes using different algorithms, such as a SHA1/SHA256/MD5 hash triplet. This will increase the confidence in a match (lower the false positive rate) but also will increase the size of the Bloom filter data structure.

In order to support attribution, the tokens resulting from the hash encryption process may be prefixed (or otherwise identified or associated with) a group identifier. This is an indication of a small but non-identifiable set of users (for example, around one hundred) that could subsequently be incorporated into a conversion signal.

Figure 3:
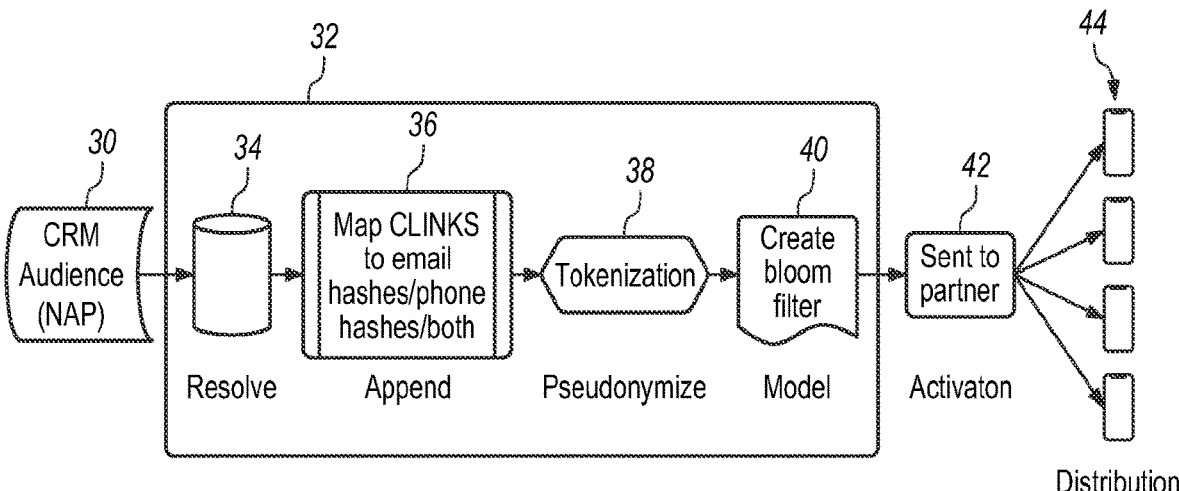
FIG. 3 is a data flow diagram according to an implementation of the present invention.

When a party seeking to send a targeting message provides a list of identifiers for users that it wishes to target with its message, then traditional identity resolution may be used to find a DSP's own internal linkages for those users. DSPs typically maintain links or identifiers for consumers, households, or businesses so that they can unambiguously resolve the identity of individuals in these groups. For example, this allows DSPs to unambiguously resolve different persons who have the same name, or to properly identify a person who has changed his or her name (such as due to marriage) as being a single person despite two different names that are known. One such identity resolution system is the AbiliTec service provided by LiveRamp, Inc. of San Francisco, California. Once this resolution is complete, an append/ enrichment step may be performed to associate all available plaintext identifiers with the linkages. Finally, the plaintext identifiers may be tokenized/encrypted and used for the creation of the corresponding Bloom filter. A diagram illustrating this process is shown in FIG. 3, with the process in this case using LiveRamp technology.

Beginning at customer relationship management (CRM) audience data 30, this input is provided to the resolution provider 32. At resolve step 34, the CRM audience data 30 is used to resolve the members of an audience to specific links. These are then mapped at append step 36 to hashed emails, hashed telephone numbers, or both, and appended to the data structure. The data structure is then pseudonymized at tokenization step 38. The resulting data then is used to create the actual Bloom filter at model step 40. At activation step 42, the Bloom filter is distributed to partners for use in various apps by means of the SDK. These will then eventually be distributed to user electronic devices 44 as the apps are downloaded by users.

In order to accept the Bloom filter that has thus been created, each app owner first configures the amount of storage that is allocated to targeted message processing through a remote management platform ("console"). In the time sequence example of FIG. 4, at time 50 the app communicates to the server asking for the configuration "ABC123." The server communicates back with the configuration and a list of filters BF1, BF2. At time 52, the app requests the filters BF1 and BF2, and the server responds with the requested filters, along with a Deal ID and expiration date for each. The app may attempt to download the bundle when convenient, such as, for example, when connected to Wi-Fi and the client device is plugged in to external power. This may, for example, be timed for the middle of the night in order to minimize any degradation of the user experience associated with the loss of performance with the client device during this time. The filter itself is downloaded to partitioned storage available within the app or application bundle. On iOS, for example, apps and their SDK will have reservations about loading large volumes of data, such as data traditionally stored on a network server. Campaigns, therefore, will in certain implementations "bid" at a particular guaranteed dollar amount (PG) for a publisher to prioritize only the most valuable audiences at a given moment in time. Later, at time 54, the app again requests the configuration "ABC123." At this later date, the server responds with the configuration and a list of filters containing only BF2. The SDK removes BF1, since it is not in this new version of the configuration. Still later, at time 56, the SDK also removes BF2, because at that point the expiration date for Bloom filter BF2 has been reached. Thus in this example, at time 58, there are no longer any Bloom filters at the app.

Figure 4:
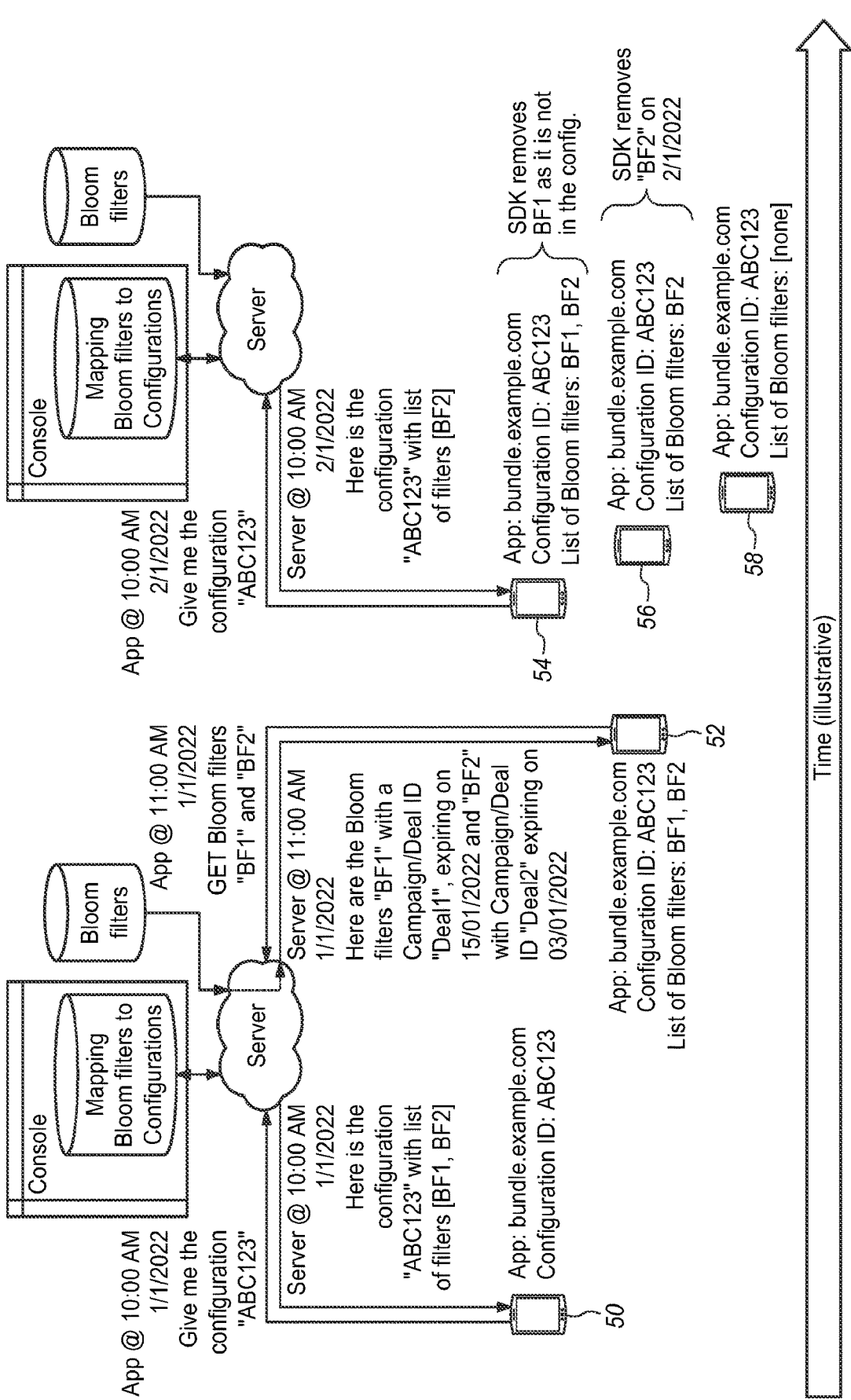
FIG. 4 is a system architecture diagram according to an implementation of the present invention.

In one particular implementation as shown in FIG. 4, the gzip file format can be used for compression. Gzipped Bloom filters that contain desired audience segments could be built as shown in Table 1 below, with the compression ratio between the raw data and the resulting Bloom filter shown in the rightmost column:

TABLE 1

| # MD5s | Input (gzipped) | Filter (gzipped) | Ratio |
|---|---|---|---|
| 10000000 | 183.7 MB | 6.7 MB | 27:1 |
| 1000000 | 18.4 MB | 1019.6 KB | 18:1 |
| 100000 | 1.8 MB | 115.6 KB | 16:1 |
| 10000 | 188.4 KB | 11.8 KB | 16:1 |

It may be seen then that if an app dedicates 10 MB (uncompressed) storage to on-device targeted messaging, it could support, for example, 847 audiences of 10,000 MD5 inputs; 87 audiences of 100,000 MD5 inputs; 9 audiences of 1,000,000 MD5 inputs; 1 audience of 10,000,000 MD5 inputs; or a combination of 3 audiences of 1,000,000 MD5 inputs in addition to 8 audiences of 100,000 MD5 inputs. The gzipped filters may, in various implementations, be downloaded nightly or weekly over Wi-Fi and set with a campaign expiration time.

Figure 5:
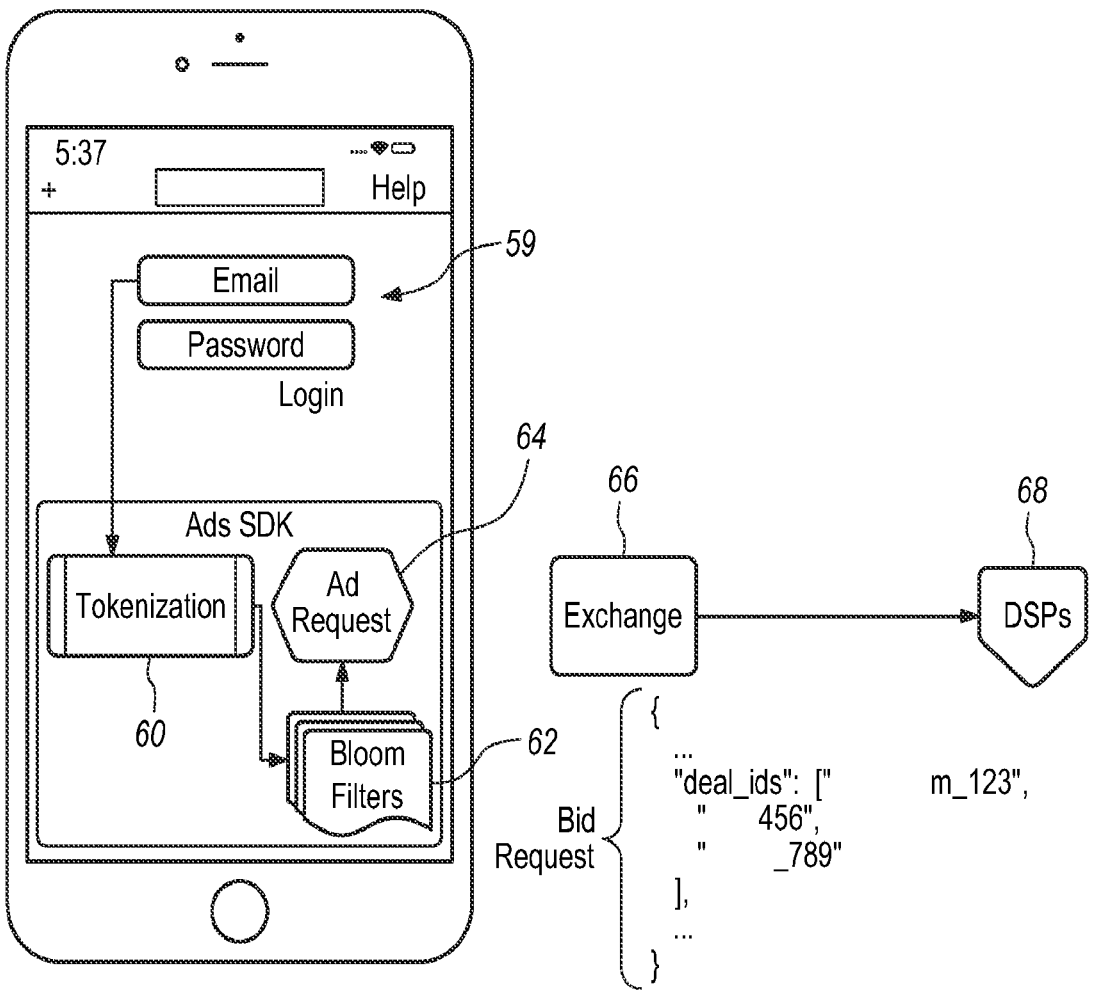
FIG. 5 is an illustration of an operation for selecting a targeted message for delivery on a client device according to an implementation of the present invention.

Referring now to FIG. 5, processing that takes place at the app for use of the Bloom filter may be described. A publisher holding PI such as an email address or telephone number 59 will pass it to a function to create a token at tokenization routine 60. This token can be queried against the set of Bloom filters 62. As already noted, the Bloom filter will give a probabilistic result of whether or not the user is in the set at some confidence interval, returning this through ad request 64 to ad exchange 66. The ad exchange 66 communicates with DSP 68. For example, the Bloom filter may in certain implementations determine with 99.9% confidence that a user is in the set. As also noted above, this interval can be adjusted depending on storage and accuracy needs. If a user matches, the SDK will flag a pre-defined deal identifier corresponding with that particular message audience from ad request 64. If not, the auction will proceed without it. Those DSPs 68 seeking to send targeted messages will know with a high degree of confidence that their deal identifier is contained in a bid request, and that a desired user is associated with the client device, but no PI is sent off of the device in order to make this determination. In order to prevent attempts at enumerating all members of the set and thereby bypass the built-in privacy of this system, calls to the Bloom filter may, in certain implementations, be put behind a rate limit meter in order to make it infeasible to "crack" the filter by this type of brute force attack.

Figure 6:
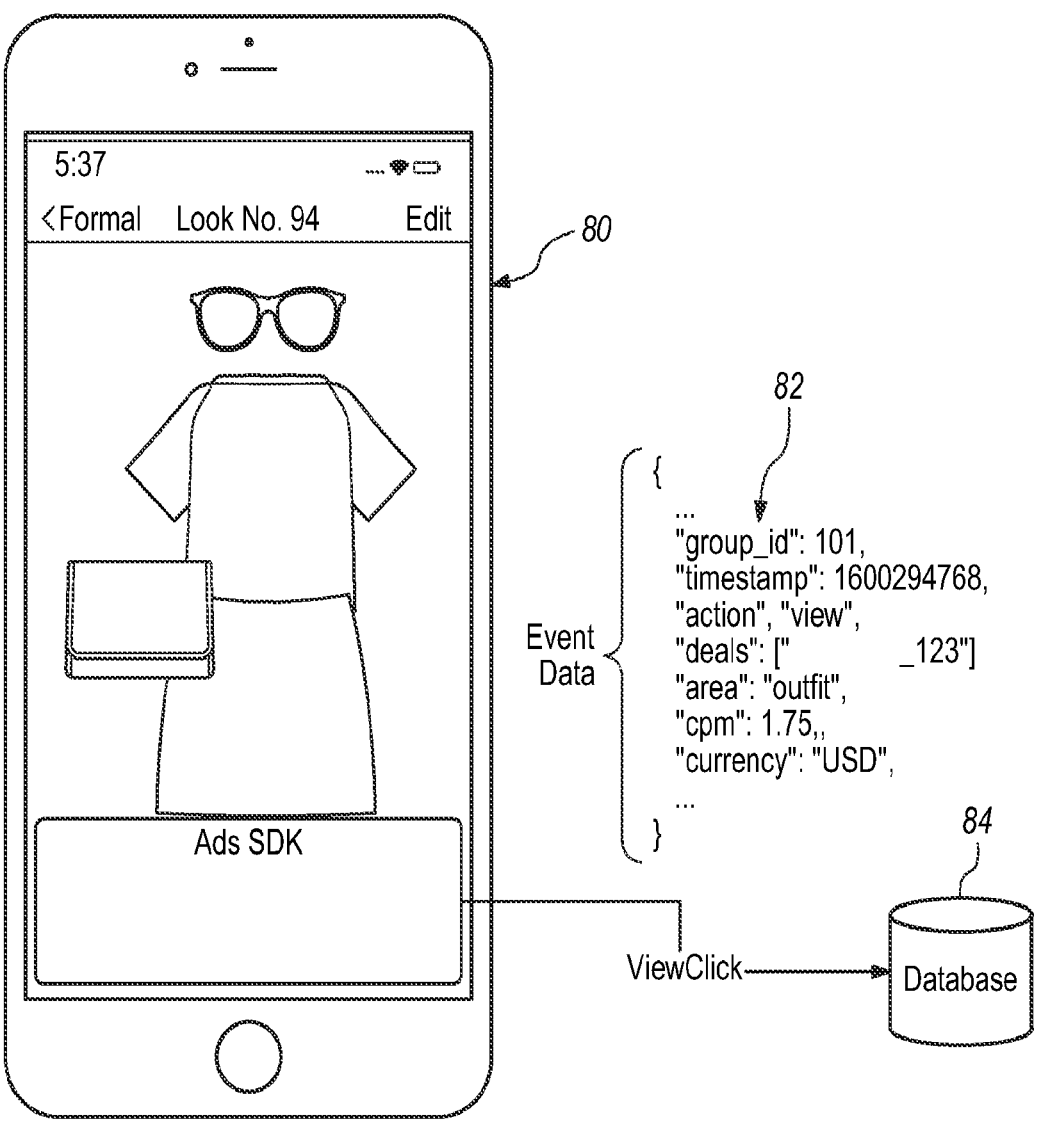
FIG. 6 is an illustration of an operation for providing analysis of the delivery of a targeted message to a client device according to an implementation of the present invention.

After-delivery attribution may be described with respect to FIG. 6. With on-device matching, user attribution after delivery of targeted messaging is inherently limited. Nevertheless, record-level events may still be supported in real time in certain implementations of the present invention. The system cannot send through user identifiers or proxies to a remote device. But when a user is served a targeted message 80 and responds, such as by clicking on an appropriate area within the display provided by the app publisher or simply viewing the displayed message 80, then a conversion event 82 is fired to the SDK server for the message 80. That conversion event 82 cannot contain user identifying information, but may contain other information that is informative in this regard. This information may, in certain examples, include the group identifier as discussed above with respect to tokenization; the bundle identifier; the deal identifier; a timestamp; and/or a creative unit associated with the targeted messaging. Other types of information may be used in alternative implementations, provided that no PI is sent to a remote device and the user's identity cannot be reasonably ascertained through the inclusion of these additional attributes. By enabling real-time reporting, the party who requests the sending of the targeted message is better able to map both "active" and "passive" events tied to conversions at an aggregate, if not at a personal, level. Such information may be stored for subsequent analysis at database 84.

The process for initialization of the SDK before use may now be described. In the preferred embodiment the SDK will include a fallback configuration. The fallback configuration is the default configuration for the SDK when there is no cached fallback configuration or cached online configuration on the device, and the network connection is not functional. This ensures that the SDK will be usable regardless of the state of the network or the console platform. If a fallback configuration is not provided, then in such embodiment the SDK may be configured to enter an error state and an error event may be triggered.

To provide a custom online configuration, the online configuration is fetched from the console platform using the provided application programming interface (API) key. If the API key is valid, and if there is a working network connection, and if there are no network errors, then a fresh configuration may be obtained from the console platform and stored at the SDK. This may be referred to then as the cached online configuration. As previously noted, the fallback configuration is the previously cached online configuration, and if no previously cached online configuration is available, then the default fallback configuration provided as part of the SDK is used.

Figure 7:
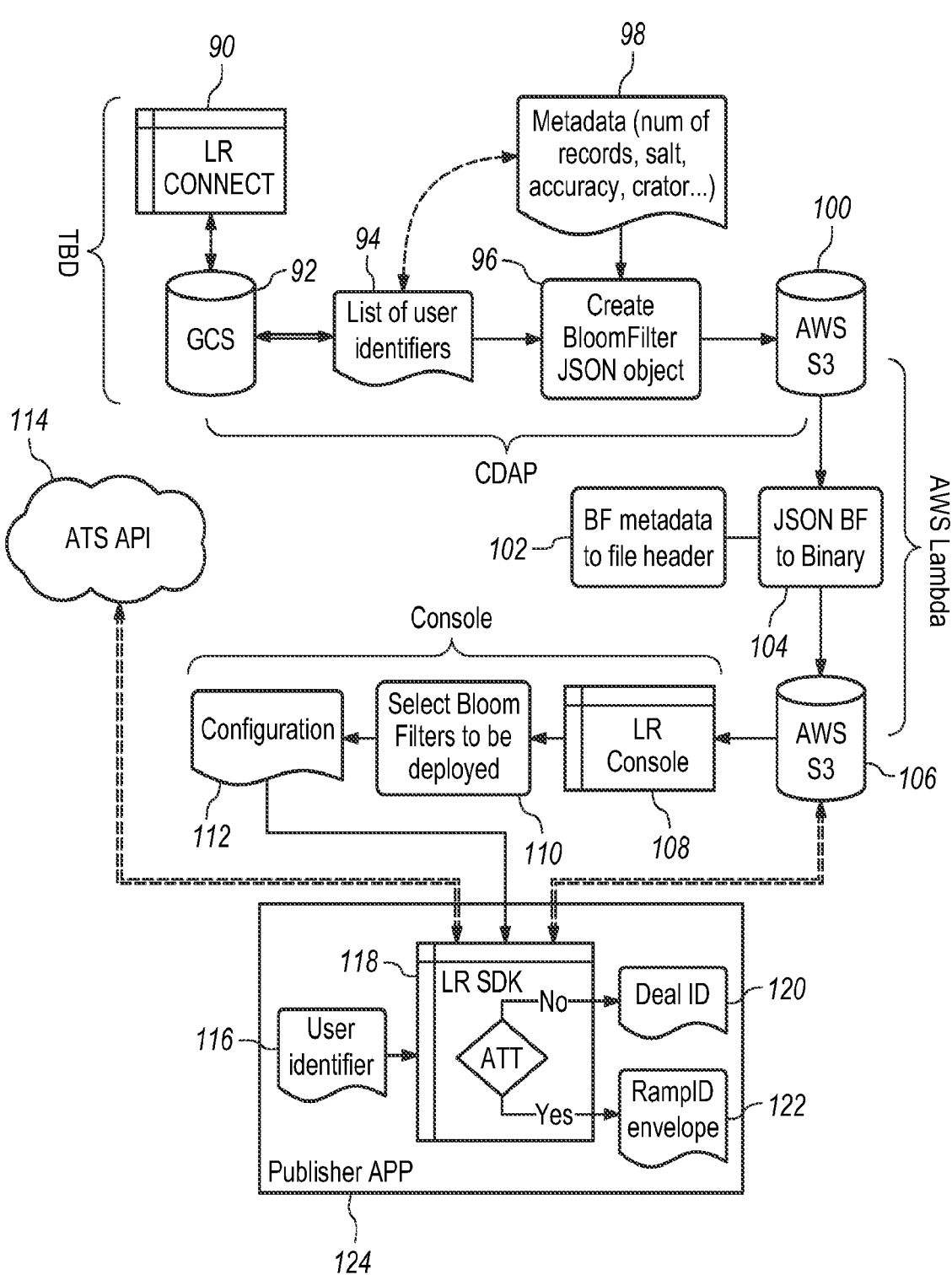
FIG. 7 is a data flow illustrating SDK initialization and configuration according to an implementation of the present invention.

Referring now to FIG. 7 to further discuss initialization and configuration of the SDK as a part of set-up for the overall system, the process may begin at a connect service 90, such as the LiveRamp Connect service provided by LiveRamp, Inc. Connect service 90 is a cloud-based software application to upload, manage and distribute data. Connect service 90 may also be used "onboard" data, that is, to take data obtained through offline transactions and move the data to an online environment so that it may be used, for example, in online digital messaging. Connect service 90 communicates with a cloud platform, in this case Google Cloud Storage (GCS) storage 92, which is part of a Cask Data Application Platform (CDAP). CDAP is a popular application platform for building and managing data applications in multi-cloud environments. A list of identifiers 94 is then used to create a Bloom filter JavaScript Object Notation (JSON) object 96, using the methods previously described. Metadata 98 may be used in this process, such metadata including components as described above. This is integrated into, in this case, an Amazon Web Services (AWS) storage 100.

The AWS storage 100 communicates with a process to convert the Bloom filter JSON object 96 to a binary form, using Bloom filter metadata 102. This is stored in a second AWS storage area 106. From this position, the console platform 108, the function of which has been previously described, is engaged in the process. From the console, the user may select the Bloom filters to be deployed at filter select process 110, and configuration is performed at configuration process 112.

The console platform 108 communicates across the network (e.g., the Internet) with the SDK 118. In this way, initialization, configuration, and the selection of Bloom filters may be performed. SDK 118 communicates with each of these processes, and pulls data from second AWS storage area 106. SDK 118 also may communicate with the authenticated traffic solution (ATS) API 114, a service offered by LiveRamp, Inc. The ATS service 114 enables publishers of content to recognize their known users on their sites in a real-time fashion, thereby enabling publishers to immediately engage with their customers based on this recognition. The API structure allows for a quick engagement and interchange of information. Publisher app 124, which includes SDK 118 as previously discussed, is able to use all of this data to perform processing including targeted messaging with respect to the user of the device on which publisher app 124 is installed.

In operation, publisher app 124 may receive an individual user identifier 116. This may occur, for example, when a user interacts with a publisher property. As part of the operation of SDK 118, an inquiry is made to determine whether the user of the device has chosen to block third-party tracking or similar functionality with respect to that particular app. In the example of iOS, the determination is made with respect to Apple's ATT service. If blocking has not been chosen, then processing proceeds in the customary manner within a programmatic messaging environment by providing a "Deal ID," which is the typical identifier used by buyers and publishers within messaging auctions in programmatic real-time bidding ecosystems. SDK 118 may receive a Deal ID 120 by sending a request for the Deal ID across to the ATS API 114. This request may be fulfilled in real time. If blocking has been chosen, then the SDK 118 instead generates in this particular example a RampID envelope. The RampID envelope, a product of LiveRamp, Inc., is an identifier and associated metadata that may be used for on-device identification and in connection with the Bloom filter functionality as previously described.

Because the system provides the opportunity for the console platform 108 to select from among various Bloom filters to be deployed at select Bloom filters step 110, the system also includes processing for the synchronization of the Bloom filters in order to fulfill such requests. Synchronization may be performed manually by the app developer or automatically as part of SDK 118 initialization as previously described. The configuration will indicate whether the SDK 118 should automatically synchronize the Bloom filters or await a manual command from console platform 108. In some embodiments, even in the case of a configuration process for automatic Bloom filter synchronization, the app developer may still at any desired time manually initiate Bloom filter synchronization through console platform 108 in order to maintain the highest level of functionality for publisher app 124.

As synchronization is triggered (either manually or automatically), SDK 118 determines whether the most current Bloom filters have already been downloaded. If so, then SDK 118 enters the ready state as no further processing is required. If the most current Bloom filters have now been downloaded, or if there are no downloaded Bloom filters present at all on SDK 118, then the synchronization process begins. Once the current and desired Bloom filters are successfully downloaded to SDK 118, then they are stored on the user device and made available to publisher app 124 for execution.

If the current and desired Bloom filter or filters fail to download, and if there are no current Bloom filters previously downloaded at SDK 118, then SDK 118 enters an error state and the corresponding error even is triggered. If SDK 118 previously used and has downloaded Bloom filters, then SDK 118 may operate in an offline mode using the previously cached filters. In certain embodiments, there may also be an event that triggers indicating that SDK 118 is using cached filters rather than the latest Bloom filters that may be available for download.

Figure 8:
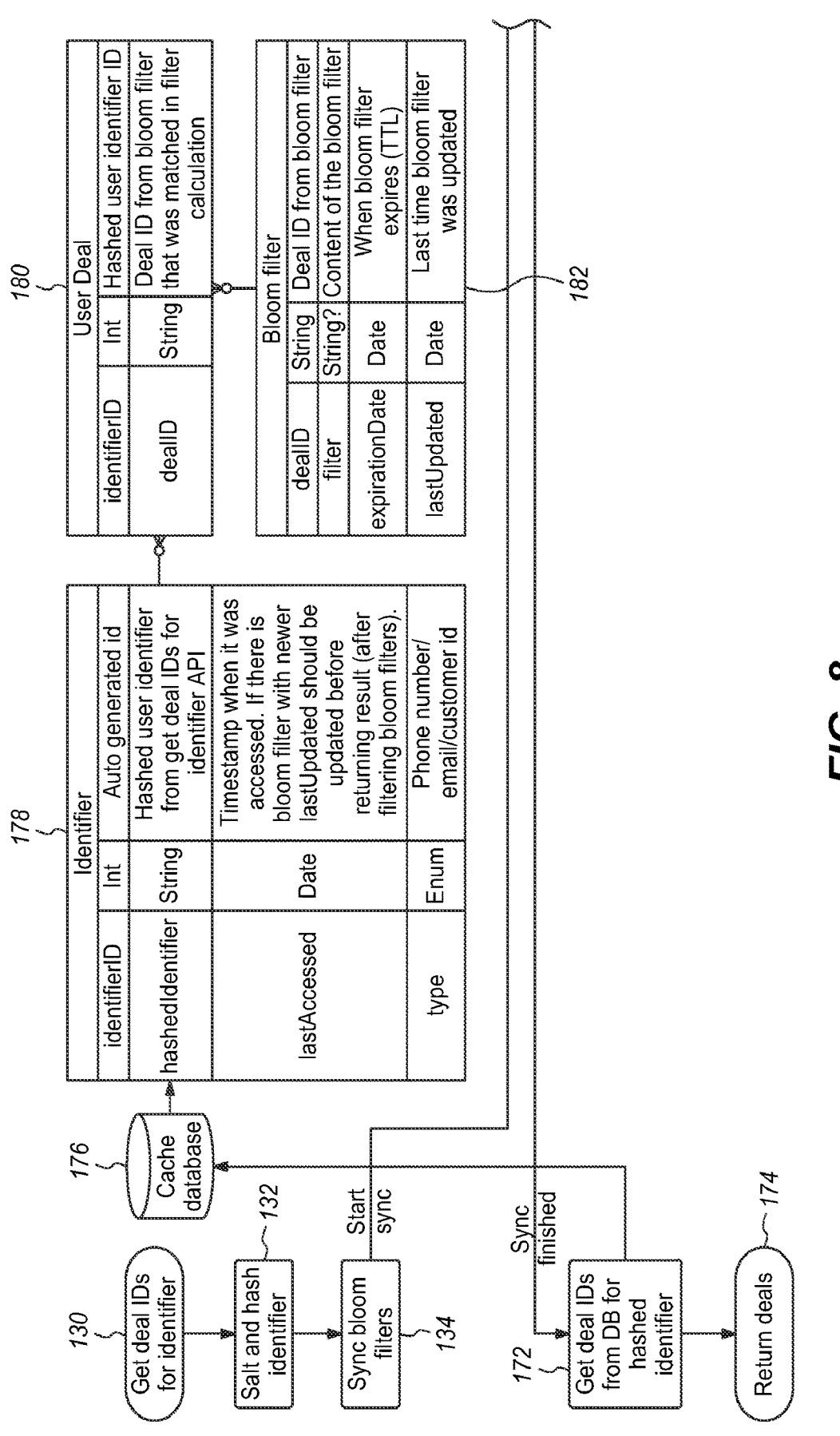
FIG. 8 is a data flow illustrating the synchronization of Bloom filters according to an implementation of the present invention.
Figure 8:
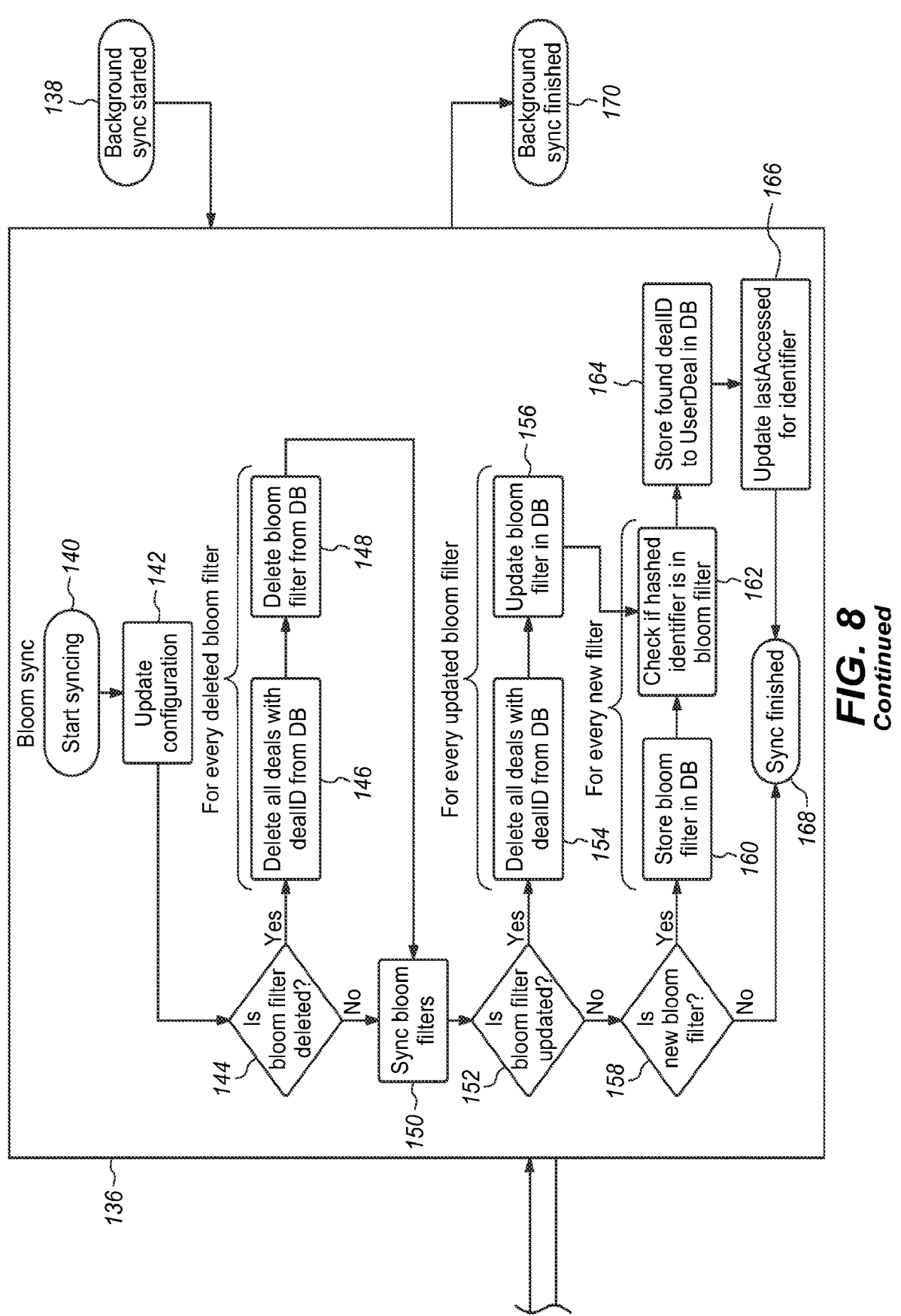

With reference to the flow chart of FIG. 8, the process for synchronizing Bloom filters with respect to SDK 118 may be described in greater detail. The process begins at get deal IDs step 130, and then those identifiers are in certain implementations salted and hashed for security purposes at salt and hash identifier step 132. With the identifiers now ready for processing, the synchronization begins at sync Bloom filters step 134. Synchronization itself is performed within synchronization block 136, which sends a signal that background synchronization has begun at sync started step 138.

From start synching step 140 in synchronization block 136, the configuration update begins at step 142. If it is determined that one or more Bloom filters have been deleted at decision step 144, then SDK 118 deletes all deals with deal IDs from cache database 176 at step 146 and deletes the corresponding Bloom filter information from cache database 176 at step 148. The synching process proper then starts at step 150, and at decision 152 a query is made, with respect to each Bloom filter, whether the Bloom filter has been updated from the version stored at SDK 118. If the Bloom filter has been updated, then all deals with the deal ID are deleted from cache database 176 corresponding to the updated Bloom filter at step 154, and then the Bloom filter is updated at step 156. If the Bloom filter is not being updated at query step 152, then at query step 158 the determination is made whether this is a new Bloom filter. If so, then the new Bloom filter is stored in cache database 176 at step 160.

If there is either an updated or new Bloom filter as determined by processing as previously described, then processing next turns to determine if the salted and hashed identifier from step 132 is found in the updated or new Bloom filter at step 162. Again, this processing takes place for each updated or new Bloom filter being processed. Once the identifier is found, it is stored in the database at step 164 and an update is made to a last accessed register for the identifier at step 166. At this point, a determination is made concerning whether the sync is finished at step 168. The sync will also show finished if there are no Bloom filters that are either updated or new. In either case, a background sync finished signal is sent at step 170.

Once the synchronization process is complete as just described, processing may move to using the Bloom filters with respect to the hashed identifier for resolution. At step 172, deal IDs are retrieved from cache database 176 for the hashed identifier, and at step 174 deals are returned.

FIG. 8 also illustrates a possible structure for each identifier 178, user deal 180, and Bloom filter 182 stored within cache database 176. Identifier 178 may consist of an identifier ID that is of variable type integer, and may be automatically generated; a hashed identifier that is of a string variable type, which is the hashed version of the identifier used at step 172; a last accessed field with is of type date and is a timestamp showing when the identifier 178 was last accessed; and finally a type field which is an enumerated variable type, and may be a data field such as a telephone number, email address, or customer ID used to match with a particular individual.

User deal 180, as stored in cache database 176, is composed of the corresponding identifier ID as set described with respect to identifier 178, as well as a deal ID of variable-type string that indicates the deal ID from the Bloom filter that was matched in the filter calculation.

Bloom filter 182, as stored in cache database 176, consists of the dealID string, which, as already noted, is the deal ID from the Bloom filter 182; a filter field that identifies the content of the Bloom filter; an expiration date that identifies when the Bloom filter expires, if an expiration date is given; and a last updated field, also of date type, which indicates when the Bloom filter 182 was last updated.

Figure 9:
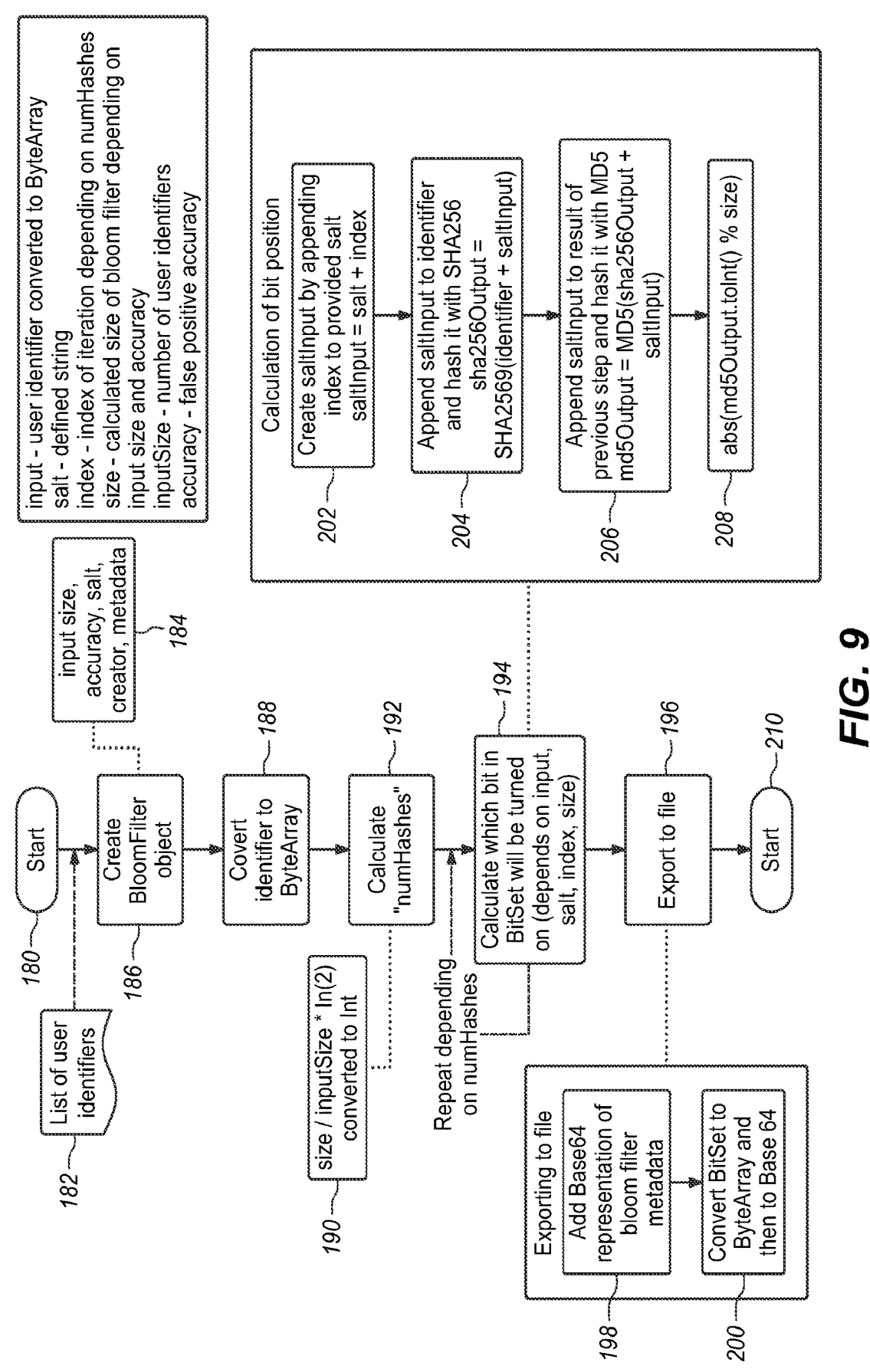
FIG. 9 is a data flow illustrating a refresh according to an implementation of the present invention.

In conjunction with a synchronization of Bloom filters as just described, an SDK 118 data refresh may be triggered on each SDK 118 initialization and on each event where the app 124 is sent from background to foreground within the device operating system. This may be performed automatically, if so defined in the configuration. If SDK 118 is in an offline mode (i.e., there is no Internet connection or no Wi-Fi in "mobile only" mode) then all cached filters that have an expiration date in the past are considered obsolete and should be deleted. FIG. 9 provides an overview of such a process. From start step 180, a last of identifiers 182 is provided along with input parameters 184. Input parameters 184 include a user identifier converted to ByteArray type as provided in certain programming languages such as Python; a salt; an index of iteration that is determined by the number of to be calculated; a size representing the calculated size of the Bloom filter depending upon the input size and the desired accuracy; an "inputSize" field representing the number of user identifiers in user identifier list 182; and the accuracy value, which represents the false positive accuracy. These are fed to the process for creating a Bloom filter object 186. At step 188 the identifier is converted to ByteArray format (i.e., an array of bytes) and the numHashes calculation is performed at step 192. This depends upon the "size" value divided by the "inputSize" value multiplied by ln(2) and converted to an integer variable type at step 190.

At step 194, the system calculates which bit in BitSet (a string of bits used for bitwise operations) will be turned on, the step being repeated depending upon the value of numHashes. The sub-steps of step 194 begin at step 202, where the index value is appended to the salt value to produce a saltInput value. This is appended to the identifier at sub-step 204, and then hashed using the SHA256 algorithm. The saltInput value is then appended to the result of sub-step 204, and hashed with the MD5 algorithm, at sub-step 206. The final sub-step 208 is performed by computing the modulus of the output of sub-step 206 with respect to the size value, and the absolute value of that result taken.

At step 196, the results of step 194 are exported to a file. This involves the sub-step 198 of adding Base64 representation to the bloom filter metadata, and then converting the BitSet variable to ByteArray and then to Base64 at sub-step 200. Processing ends for the refresh at end step 210.

In the implementations described herein and in various alternative implementations, the present invention may be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memory may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application)

readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fiber Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The invention claimed is:

1. A method for providing on-device identity resolution, the method comprising the steps of:

at a resolution provider, receiving a plurality of audience member records;

resolving each of the plurality of audience member records to an audience member link to create a plurality of audience member links;

mapping each of the audience member links to a corresponding hashed personal identifier to create a data structure;

pseudonymizing the data structure to produce a plurality of pseudonymized hashed personal identifiers;

at an at least one Bloom filter comprising a bit vector comprising a plurality of bits, for each of the pseudonymized hashed personal identifiers, setting each bit in the bit vector at the index to the pseudonymized hashed personal identifier to a value of 1;

transmitting the at least one Bloom filter to a software development kit (SDK) on a user device, wherein the SDK comprises an app;

at the app, receiving from a publisher an item of personal information (PI);

creating a token from the item of PI;

querying the token against the at least one Bloom filter to determine a match result or no-match result;

sending the result from the query to an ad exchange;

if the result is a match, flagging a pre-defined deal identifier corresponding to a particular message audience;

receiving from the publisher a conversion event; and performing an SDK refresh on initialization and on each event where the app is sent from background to foreground on the user device, wherein the step of performing an SDK refresh further comprises deleting the at least one Bloom filter from a filter cache if the at least one Bloom filter has expired.

2. The method of claim 1, wherein the item of PI is an email address or a telephone number.

3. The method of claim 2, wherein the conversion event comprises no PI.

4. The method of claim 3, further comprising the step of allocating through the app an amount of storage on the user device for the at least one Bloom filter.

5. The method of claim 4, wherein the step of allocating through the app an amount of storage on the user device is performed through a remote management platform.

6. The method of claim 5, further comprising the step of sending a Deal ID and an expiration date for the at least one Bloom filter to the app.

7. The method of claim 6, further comprising the step fetching an online configuration for the SDK from the remote management platform using an application programming interface (API) key.

8. The method of claim 7, further comprising the steps of creating the at least one Bloom filter as a JavaScript Object Notation (JSON) object, and then converting the JSON object to a binary form using Bloom filter metadata.

9. The method of claim 8, wherein the at least one Bloom filter is selected from among a plurality of Bloom filters through the remote management platform.

10. The method of claim 9, further comprising the step of receiving from the publisher a user identifier.

11. The method of claim 10, wherein the user identifier is either a deal ID or an identity envelope.

12. The method of claim 11, further comprising the step of synchronizing the at least one Bloom filter by deleting all deal IDs for corresponding to the at least one Bloom filter if the at least one Bloom filter has been deleted.

13. The method of claim 12, wherein the step of synchronizing the at least one Bloom filter further comprises the step of receiving a Bloom filter identifier and updating a last-accessed register with the Bloom filter identifier.

14. The method of claim 13, wherein the Bloom filter identifier is a variable type integer, a hashed string, a last-accessed field, or a type field comprising a telephone number, email address, or customer ID.

15. The method of claim 1, wherein the match result comprises a probabilistic result at a set confidence interval.

16. The method of claim 15, further comprising the step of limiting the rate of calls to the at least one Bloom filter.

17. A system for providing on-device identity resolution, comprising:

a resolution provider configured to receive a plurality of audience member records, resolve each of the plurality of audience member records to an audience member link to create a plurality of audience member links, map each of the audience member links to a corresponding hashed personal identifier to create a data structure, and pseudonymize the data structure to produce a plurality of pseudonymized hashed personal identifiers;

at least one Bloom filter comprising a bit vector comprising a plurality of bits, wherein the resolution provider is further configured to, for each of the pseudonymized hashed personal identifiers, set each bit in the bit vector at the index to the pseudonymized hashed personal identifier to a value of 1;

a software development kit (SDK) on a user device, wherein the SDK comprises an app, and wherein the at least one Bloom filter is transmitted to the SDK;

wherein the app is configured to: receive an item of personal information (PI) from a publisher; create a token from the item of PI; query the token against the at least one Bloom filter to determine a match result or no-match result; send the result from the query to an ad exchange; if the result is a match, flag a pre-defined deal identifier corresponding to a particular message audience; receive from the publisher a conversion event; and perform an SDK refresh on initialization and on each event where the app is sent from background to foreground on the user device, wherein the step of performing an SDK refresh further comprises deleting the at least one Bloom filter from a filter cache if the at least one Bloom filter has expired.

18. The system of claim 17, wherein the SDK further comprises a rate limit module configured to limit a rate of queries to the at least one Bloom filter.

* * * * *